Oct. 9, 1945.    F. J. HOGENMILLER    2,386,464
APPARATUS FOR PRODUCING FIRE EXTINGUISHING FOAM
Filed March 12, 1943    2 Sheets-Sheet 1
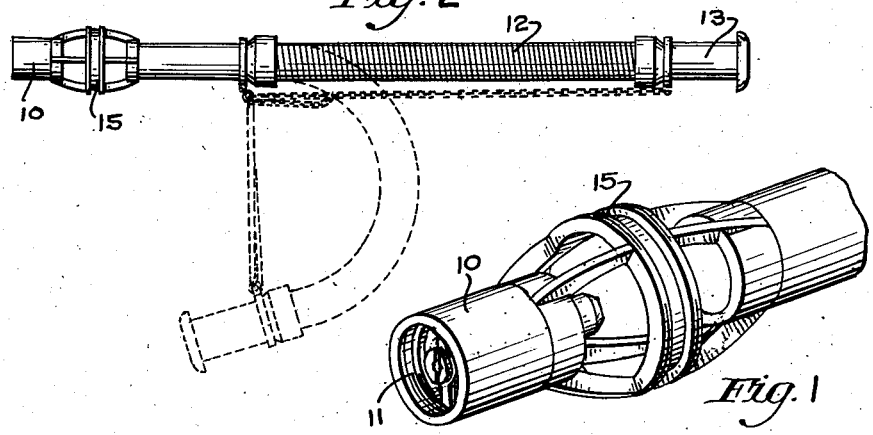
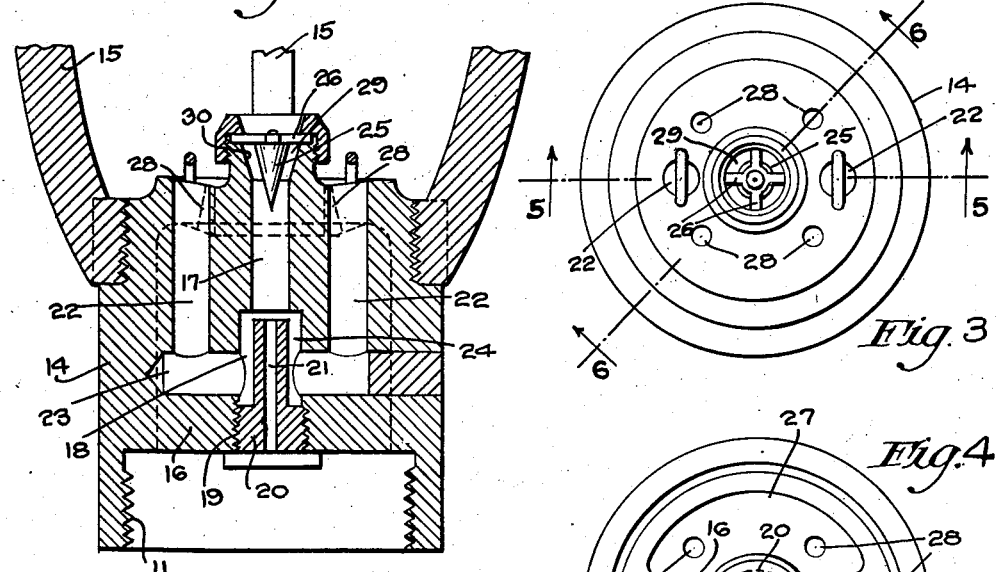
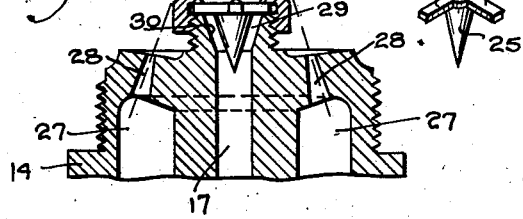
Inventor:
FRANCIS J. HOGENMILLER
By Leon Edelson
Attorney

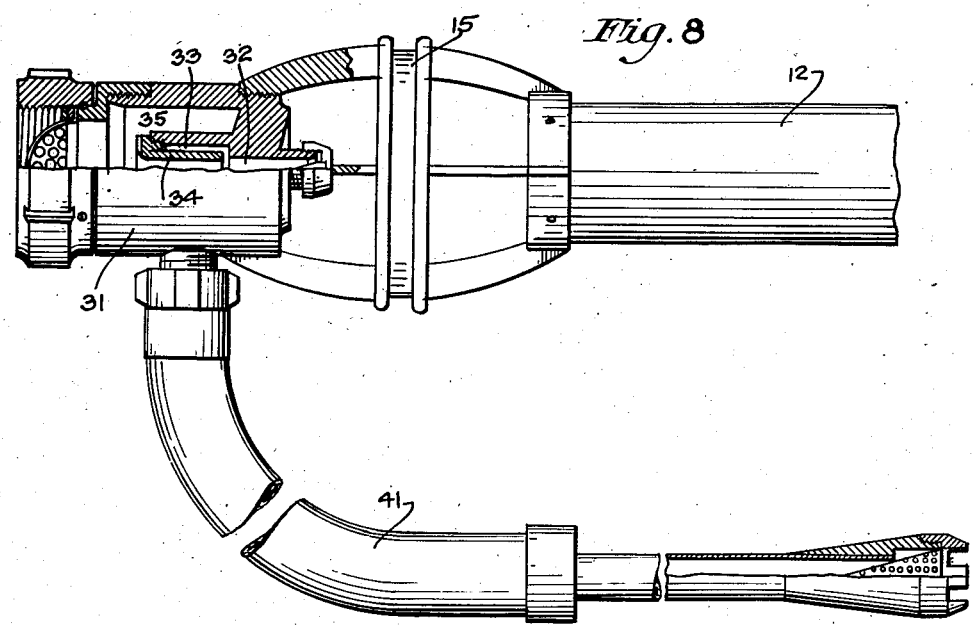
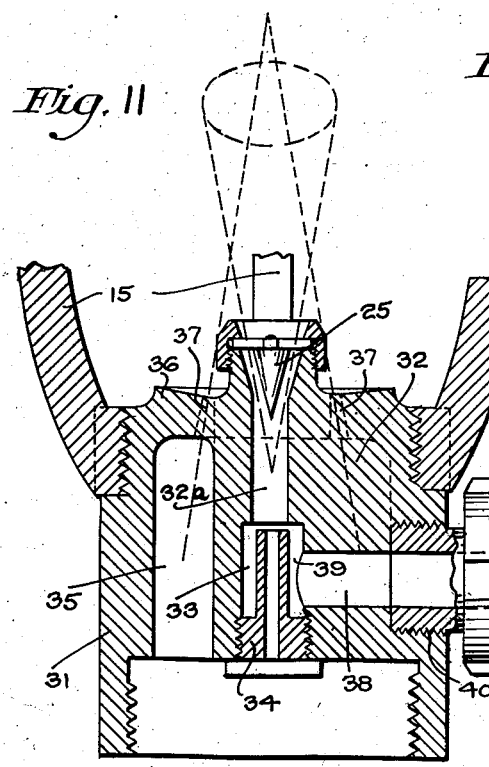
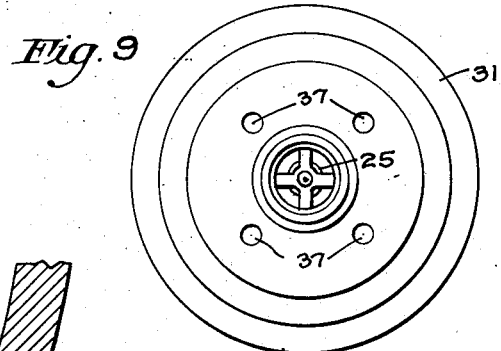
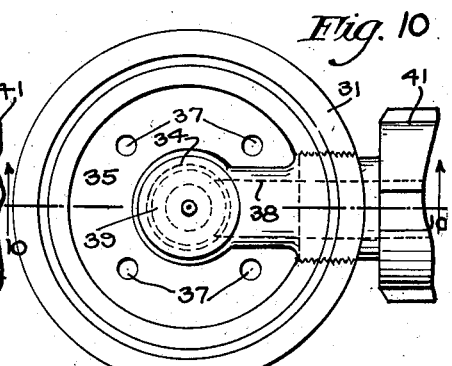

Patented Oct. 9, 1945

2,386,464

UNITED STATES PATENT OFFICE 2,386,464

APPARATUS FOR PRODUCING FIRE EXTINGUISHING FOAM

Francis J. Hogenmiller, Philadelphia, Pa., assignor to National Foam System, Inc., Philadelphia, Pa., a corporation of Delaware Application March 12, 1943, Serial No. 478,877

5 Claims. (Cl. 261—116)

This invention relates generally to apparatus for use in the generation of mechanical or air foam employed in the extinguishment of fires and more particularly to improved means for insuring entrainment of such sufficient amount of air in a flowing stream of stabilized water as to produce a stable, durable and large volume of foam satisfactory for fire extinguishing purposes.

Among the principal objects of the present invention is to provide improved means for obtaining the necessary degree of turbulence in the stabilized stream at the locus of introduction of air or other gas, said means being adapted for employment generally in any system for producing mechanical or air foam, as for example, such as are described and shown in United States Letters Patent No. 2,106,043, granted January 18, 1938, and No. 2,198,585, granted April 23, 1940.

In the production of mechanical foam, in order to obtain an adequate volume of foam in relation to the amount of water used, it is necessary to finely subdivide and disperse the stream of water at the locus of introduction of the air, not only to provide for a substantial increase in the total surface area of the water, but also to provide for an intimate mingling of the water stabilizer and air in the mixing zone. While various expedients have been resorted to for effecting turbulence in the stream, in practically all cases such turbulence has been based upon the principle of mechanically subdividing or breaking up the flowing stream at the point or in the zone where air is to be entrained therein. The device of the present invention operates to create turbulence in the flowing stream through the employment of means for increasing substantially the surface area of the water stream by having a portion thereof discharged in the form of an outwardly flaring cone and other portions in the form of jets which intersect the conical stream at a plurality of circumferentially spaced points to thereby disrupt and disperse effectively the originally solid stream.

In one form of the present invention, the stream discharger is employed to discharge water mixed with the stabilizing material simultaneously in the shape of said outwardly flaring cone and said intersecting jets, while in another form it is employed to discharge water mixed with stabilizing material in the shape of said cone and plane water in the shape of said intersecting jets, it being among the objects of the invention to effect, in both instances, the discharge of the cone and jets in such manner and in such relation one to the other that not only is the original solid stream finely subdivided, but also thorough mixing of the water, stabilizing material and air is insured to produce the largest possible volume of foam.

A still further object is to provide in a device of the character aforesaid means for preliminarily aspirating air into the stabilized stream just prior to the point where it is rendered turbulent, this means being employed generally in that arrangement wherein the water is initially mixed with the stabilizing material for delivery, as a solid stream, to the discharger head.

Other objects and advantages of the invention will appear more fully hereinafter, it being understood that the present invention consists substantially in the combination, construction, location and relative arrangement of parts, all as will appear more fully hereinafter, as shown in the accompanying drawings and as finally pointed out in the appended claims.

In the accompanying drawings, which are illustrative of certain preferred embodiments of the present invention:

Figure 1 is a perspective view of a foam generator constructed in accordance with and embodying the principles of the present invention;

Figure 2 is a side elevational view of a foam discharging conduit fitted to the stream discharger of the present invention;

Figure 3 is a view of the discharge end of said discharger;

Figure 4 is a view of the inlet end thereof;

Figure 5 is a central longitudinal sectional view of the stream discharger taken on the line 5—5 of Figure 3;

Figure 6 is a sectional view of the discharge end of the stream discharger taken on the line 6—6 of Figure 3;

Figure 7 is a perspective view of one of the turbulence-producing elements of the stream discharger;

Figure 8 is a view, shown partly in section, of a modified form of stream discharger and stabilizer pick-up tube attached thereto;

Figure 9 is a view of the discharge end thereof;

Figure 10 is a view of the inlet end thereof; and

Figure 11 is a sectional view taken on the line 10—10 of Figure 10.

Referring now to the drawings and more particularly to Figures 1 and 2, it will be understood that the foam generating device, designated generally by the reference numeral 10, is adapted to be connected, by means of its interiorly threaded end 11, to a conduit (not shown) through which is supplied, under suitable pressure, the stabilizer solution, usually consisting of water with which is intimately mixed a foam promoting agent, such as saponin or other suitable substance known in the art generally as "stabilizers."

The stream of water which is thus mixed with the stabilizing material is delivered to the foam generating device 10 by which it is broken up into finely divided particles at the same time that aspiration of air is effected to produce the so-called air or mechanical foam in accordance with the principles described in the aforesaid patents, Nos. 2,106,043 and 2,198,585, the foam so produced being discharged by way of the flexible conduit 12 and the nozzle 13.

Referring now more particularly to Figures 3 to 7 inclusive, which illustrate one embodiment of the device 10, it will be observed that it includes a main body member 14, the rear end of which is connected to the conduit supplying the foam-forming solution, while the forward end is fitted with an open cage member 15 connected to the flexible conduit section terminating in the foam discharge nozzle 13. The body member 14 is provided with an internal transverse web 16 having a central bore 17 extending longitudinally therethrough, the rear portion 18 of said bore being of enlarged diameter and internally threaded, as at 19, to receive the tubular member 20. The bore 21 of this latter member is of such restricted diameter in relation to the diameter of the axially spaced forward section of the bore 17 as to form an ejector for entraining air from atmosphere into the stabilized stream approximately at the point where such stream emerges from the bore 21, this air being supplied by way of the passages 22, each of which extends longitudinally through the web 16 from the forward face of the body member 14 to a transverse passage 23 in communication with the annular space 24 surrounding the internal member 20.

The stabilized stream of water ejected from the member 20 passes through the forward section of the bore 17 in the form of a high velocity jet and is directed against the tip of a conical deflector element 25 which is fitted in the flared outer or discharge end of the bore 17. It will be apparent that impingement of the jet upon the tip of the deflector element 25 will cause it to emerge from the bore 17 in the form of an outwardly flaring annular stream which, because of its increased surface area, has an increased capacity for entraining air. Preferably, this flaring stream is broken up and subdivided into several segments by the radially extending elements 26 which are secured to and support the conical deflector 25 in position.

The arcuate recesses 27—27 in the body member 10, which are formed upon opposite sides of the web 16, communicate with the supply conduit and are provided at their outer ends with restricted discharge openings 28—28 formed in the front end wall of the body member. These discharge openings 28—28 are uniformly spaced from each other with their axes relatively so inclined that they intersect the surface of the conical stream formed by the conical deflector element 25 at points within the confines of the open cage member 15. Inasmuch as the jets emerging from the openings 28—28 converge toward the central axis of the stream while the stream emerging from the bore 17 diverges from said axis, it will be apparent that the several jets will intersect the surface of the conical stream in regions spaced about a central common axis.

In consequence, the stream is subjected to a high degree of turbulence and is broken up into such minute particles that a greater than normal amount of air is entrained therein with resulting increase in the formation of foam.

It will be observed that in the form of apparatus just described, the foam-forming solution consisting of water mixed with the stabilizer agent is delivered to the jet discharger 10 for discharge therefrom simultaneously by way of the restricted jet discharge openings 28 and by way of the outwardly flaring restricted passage 29 formed between the conical deflector element 25 and the tapered wall 30 formed at the outer end of the central passage 17. It is also important to note that by virtue of the passages 22—22 and 23, which are in communication with atmosphere, a certain amount of air is entrained in the central portion of the solid stream of the solution which emerges from the passage 17 in the form of an outwardly flaring stream. The air which is thus preliminarily entrained in this central portion of the stream becomes more or less thoroughly mixed with the solution as the said stream emerges from the conical passage 29, this aeration of the stream being facilitated by its impingement against the tip of the conical deflector element 25 and its radial supporting elements 26. The outwardly flaring annular stream of foam-forming solution, which is thus impregnated with air, is still further aerated by the aspiration of air drawn from atmosphere in the several zones of turbulence created by the impingement of the several jets of solution discharged from the openings 28 against the surface of the central annular stream of solution. These converging jets which are discharged from the restricted openings 28 not only impinge against and so break up the outwardly flaring conical stream to create several zones of turbulence spaced about the central axis of the stream, but they also tend to pierce the said conical stream for convergence at a point along said axis to create still another and independent zone of turbulence, in consequence of which the originally solid stream of foam-forming solution no longer exists as such, but is instead so finely subdivided as to make possible the entrainment of the greatest possible amount of air practically instantaneously in the several closely related zones of turbulence, thus insuring the production of the largest possible volume of foam in relation to the amount of water used.

It will be understood, of course, that in certain instances it may be desirable or necessary to introduce the stabilizing agent into the stream of water at the foam discharger instead of delivering the pre-mixed foam-forming solution to the discharger as hereinbefore described. In such case, the discharger may be modified somewhat as shown in Figures 8 to 11 inclusive, wherein it will be observed that instead of providing for preliminary aspiration of air into the central portion of the fluid stream prior to its discharge from the conically-shaped discharge opening, foam-stabilizing material is drawn by suction into said portion of the stream.

Thus, the main body member 31 of the discharger is provided, exactly as in its previously described form, with an internal transverse web 32 having a central bore 32ª extending longitudinally therethrough, the rear portion of which is enlarged, as at 33, to receive the tubular insert 34. The web 32, however, need not extend across the full diameter of the internal recess of the member 14, but instead may extend radially inwardly from one side of said recess to a point spaced from the diametrically opposed side of the recess so as to provide a C-shaped space 35 extending about the web 32. The closed frontal end 36 of the discharger body is provided, as in the previously described form, with a plurality of restricted discharge openings 37, the axes of which, preferably, are relatively so inclined that they produce converging jets which are directed along lines which intersect at a point located frontally of and along the central axis of the discharger and with the confines of the open cage member 45.

Formed in the internal web 32 of the discharger is a transverse passage 38, the inner end of which is in free communication with the annular space 39 surrounding the internal tubular member 34, while the outer end of said passage is internally threaded, as at 40, to receive one end of a pick-up tub 41 leading to a supply of liquid stabilizing material.

When the discharger of Figures 8 to 11 is suitably connected to the water supply line, clear water under pressure enters the internal recess 35 and is discharged therefrom by the way of the restricted openings 37 in the form of high velocity jets, preferably converging to a common point where they impinge and create a turbulent condition in the stream to facilitate the aspiration therein of air from atmosphere. At the same time, a portion of this clear water stream enters the bore of the tubular member 34 and, in passing therefrom in the form of a high velocity jet into the central passage 32ª, an injector action is induced which causes the stabilizing material to be drawn by suction from its source of supply (not shown) through the pick-up tube 41 into the stream of water approximately at the point where it emerges from the bore of the member 34. Thus, foam-forming solution, consisting of water mixed with the stabilizer, is discharged from the central passage 32ª in the form of an outwardly flaring annular stream, the outer end of said passage being shaped and provided with a conical deflector as in the previously described form of the discharger.

Except for the fact that in the discharger of Figures 8 to 11, the liquid discharged from the jet openings 37 is plain water free of stabilizing material, whereas in that of Figures 3 to 6 the liquid is water charged with stabilizing material, the operation of both forms of the discharger is essentially the same because in both cases the central outwardly flaring stream, which is composed of foam-forming solution, is finely subdivided and dispersed by the impinging jets emerging from the restricted jet openings with the net result that seevral zones of turbulence are created in the presence of air from atmosphere to produce an intimate mixture of water, stabilizing material and air under such conditions of agitation as to produce a maximum amount of foam.

What is claimed as new and useful is:

1. In an apparatus for producing fire extinguishing foam, a foam-delivery tube having an entrance end and an open discharge end, a jet discharger for a foam-forming solution secured to the entrance end of the tube in axially spaced relation with respect thereto to provide a space open to atmosphere between the discharger and the tube, said discharger being provided with an integral forward end wall having formed therein a central restricted passage for the delivery of a foam-forming solution therethrough in the form of a high velocity jet, means in the terminal end of said passage to effect the discharge of the jet into said open space in the form of an outwardly divergent annular stream, and means for entraining air from atmosphere through said end wall and into said jet preliminarily to its discharge from said passage.

2. In an apparatus for producing fire extinguishing foam, a foam-delivery tube having an entrance end and an open discharge end, a jet discharger for a foam-forming solution secured to the entrance end of the tube in axially spaced relation with respect thereto to provide a space open to atmosphere between the discharger and the tube, said discharger being provided with an integral forward end wall having a bore extending axially therethrough, said bore terminating at its rear end in an enlarged recess which is in communication with the atmosphere by way of passages formed in the body of the discharger and extending through said end wall, a tubular member fitted in said recess with its bore axially alined and spaced from said first-mentioned bore, the bore of said tubular element being of such restricted diameter relatively to that of said first-mentioned bore that as the solution passes from the restricted bore into the first-mentioned bore in the form of a high velocity jet, air from atmosphere is entrained in said jet.

3. In an apparatus for producing fire extinguishing foam, a foam-delivery tube having an entrance end and an open discharge end, a jet discharger for a foam-forming solution secured to the entrance end of the tube in axially spaced relation with respect thereto to provide a space open to atmosphere between the discharger and the tube, said discharger being provided with an integral end wall having a bore extending axially therethrough, said bore terminating at its rear end in an enlarged recess which is in communication with the atmosphere by way of passages formed in the body of the discharger and extending through said end wall, a tubular member fitted in said recess with its bore axially alined and spaced from said first-mentioned bore, the bore of said tubular element being of such restricted diameter relatively to that of said first-mentioned bore that as the solution passes from the restricted bore into the first-mentioned bore in the form of a high velocity jet, air from atmosphere is entrained in said jet, and means in the terminal end of said first-mentioned bore to effect the discharge of the solution entrained with air in the form of an outwardly divergent annular stream.

4. In an apparatus for producing fire extinguishing foam wherein is employed a foam-conveying tube having entrance and discharge ends, a jet discharger for a foam-forming solution adapted to be secured to the entrance end of the tube in axially spaced relation with respect thereto to provide a space open to atmosphere between the discharger and the tube, said discharger including a main body member through which axially extends a central bore having an externally threaded outwardly flared terminal portion, a tubular element fitted in the rear end of said bore and having a restricted passage therethrough coaxial with the bore to effect the delivery of a solid stream of liquid at high velocity through said bore, a conical deflector fixedly secured in the terminal portion of said bore to provide conjointly with said terminal portion an outwardly flared annular recess by which the said high velocity stream is discharged through the said space open to atmosphere in the form of an outwardly divergent annular stream of such ample external surface area as to render it capable of entraining a substantial quantity of air from atmosphere, said conical deflector having radial elements engaging the end of said terminal portion, and an annular retainer threadedly engaging said threaded terminal portion to clamp said radial elements in position with said conical element centered in the terminal portion of the central bore aforesaid.

5. In an apparatus for producing fire extinguishing foam wherein is employed a foam-conveying tube having entrance and discharge ends, a jet discharger for a foam-forming solution adapted to be secured to the entrance end of the tube in axially spaced relation with respect thereto to provide a space open to atmosphere between the discharger and the tube, said discharger including a main body member through which axially extends a central bore having an externally threaded outwardly flared forward terminal portion, said bore terminating at its rear end in an enlarged recess in communication with a passage extending laterally through the discharger body for connection to a supply of foam-forming material, a tubular element fitted in said enlarged recess and having a restricted passage coaxial with said bore to effect the delivery of a solid stream of liquid at high velocity through said bore, said tubular element being axially spaced from said bore and so operatively associated therewith as to provide an ejector means within the body of said discharger for entraining foam-forming material in said solid stream of liquid by suction, a conical deflector fixedly secured in the terminal portion of said bore to provide conjointly with said terminal end an outwardly flared annular recess by which the said high velocity stream is discharged through the said space open to atmosphere in the form of an outwardly divergent annular stream of such ample external surface area as to render it capable of entraining a substantial quantity of air from atmosphere, said conical deflector having spaced radial elements engaging the end of said terminal portion, and an annular retainer internally threaded to engage said threaded terminal portion for clamping said radial elements in position with the conical element centered in the terminal portion of the bore aforesaid.

FRANCIS J. HOGENMILLER.